3,036,077
AMINOBENZANTHRONE DYESTUFFS
Hans Altermatt, Reinach, Basel-Land, Switzerland, assignor to Ciba Limited, Basel, Switzerland, a Swiss firm
No Drawing. Filed Dec. 14, 1959, Ser. No. 859,140
Claims priority, application Switzerland Dec. 22, 1958
13 Claims. (Cl. 260—272)

This invention provides dyestuffs of the general formula

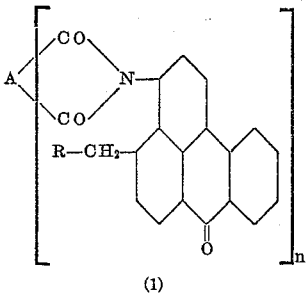

(1)

or

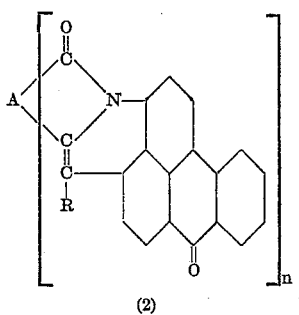

(2)

in which $n$ is the whole number 1 or 2, A represents an alkylene or arylene radical, in which the —CO— groups of the pair or each pair thereof are separated from one another by 2 or 3 carbon atoms, and R represents a hydrogen atom or an organic radical, and in which the benzanthrone radical or radicals may contain further substituents, advantageously non-ionic substituents.

The invention also provides a process for the manufacture of the above new dyestuffs, wherein one molecular proportion of an agent capable of introducing a carboxylic acid radical of the formula

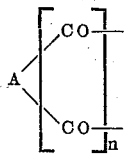

in which $n$ is the whole number 1 or 2 and A represents an arylene or alkylene radical, in which the —CO— groups of the pair or each pair of such groups are separated from one another by two or three carbon atoms, is reacted, when $n$ is 1, with one molecular proportion of an aminobenzanthrone of the formula

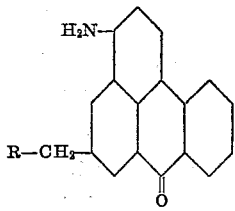

in which R represents a hydrogen atom or an organic radical, and in which the benzanthrone radical may contain further substituents, or, when $n$ is 2, with two molecular proportions of such an aminobenzanthrone, and, if desired, the resulting cyclic imide of the above Formula 1 is subjected to ring closure accompanied by the elimination of water, and, if desired, the product so obtained is subjected to further reaction.

The substituent R in the aminobenzathrone used as starting material is advantageously a hydrogen atom, but it may be a lower alkyl group, for example, a methyl, ethyl, propyl or butyl group, or a benzene radical or a cyano or carbalkoxy group. The benzanthrone radical may contain further substituents, for example, halogen atoms, alkoxy groups, alkyl groups, for example, a methyl group in the Bz-3-position, a benzene radical or a further phthaloylamino group especially in the 6-position.

As agents capable of introducing a dicarboxylic acid radical of the above formula, in which the —CO— groups are separated from each other by two or three carbon atoms, there may be mentioned, for example, aliphatic dicarboxylic acids or anhydrides thereof, especially maleic anhydride. Of special interest are ortho-dicarboxylic acids of the benzene series or anhydrides thereof, for example, phthalic acid or benzene-1:2:4:5-tetracarboxylic acid or naphthalene peri-carboxylic acids or anhydrides thereof, for example, naphthalene-1:8-dicarboxylic acid or -1:4:5:8-tetracarboxylic acid. These aryl-carboxylic acids may contain further substituents in the benzene nuclei, for example, halogen atoms especially chlorine atoms, or alkyl, alkoxy or nitro groups. As examples of substituted phthalic acids there may be mentioned 3- or 4-nitrophthalic acid, 4-chlorophthalic acid, 3:6-, 3:4- or 4:5-dichlorophthalic acid and tetrachlorophthalic acid.

The reaction of the aminobenzanthrone with the acylating agent is advantageously carried out at a raised temperature and preferably in the presence of a solvent, for example, glacial acetic acid, nitrobenzene, chlorobenzene, dichlorobenzene, trichlorobenzene or naphthalene. The addition of ferric chloride may have an accelerating action. The compounds of the Formula 1 so obtained are valuable brown dyestuffs which can be used for dyeing spinning compositions, for example, viscose, cellulose esters or polyacrylonitrile. In this manner brown dyeings of good fastness to light are obtained. However, when compounds of the Formula 1 are used for coloring high melting spinning compositions, for example, superpolyamides or polyethylene terephthalates, ring closure to the corresponding compound of the Formula 2 takes place in the melt with the elimination of water, which can be recognized by the violet coloration.

The ring closure to form a compound of the Formula 2 may be carried out in substance by simply heating the compound of the Formula 1 above its melting point. This reaction is advantageously carried out with the exclusion of air, for example, in vacuo or in an atmosphere of nitrogen, or in the presence of a high melting substance, especially a water-soluble salt of which the melting point is in the vicinity of the melting point of the compound of the Formula 2. Such salts have the advantage that they can easily be separated from the final product of the process by dissolution in water. The ring closure can also be brought about by heating the compound of the Formula 1 with an alkaline agent, for example, an alkali metal hydroxide or alcoholate. Other agents capable of eliminating water can be used such, for example, as baking with one molecular proportion of sulfuric acid or melting the product in pyrophosphoric acid. The condensation product can also be produced directly, that is to say, without isolating the cyclic imide. Further reactions may be carried out upon the condensation product. By halogenating a compound of the Formula 2 there are obtained halogenated products of which the halogen atoms can be exchanged, for example, for amine radicals, especially the radicals of aminoanthraquinones. The anthrimides so obtained may be carbazolized.

The dyestuffs of the above Formula 2 can be used for dyeing a very wide variety of organic compounds, but especially for coloring spinning compositions, for example, viscose, cellulose esters, polyacrylonitrile or polyamides, for example, nylon or polyesters, especially polyethylene terephthalates, which yield, after spinning, violet colored fibers of good fastness to light. Some of the dyestuffs of this invention are useful as vat dyestuffs.

The following examples illustrate the invention, the parts and percentages being by weight.

*Example 1*

A solution of 148 parts of phthalic anhydride in 1750 parts by volume of boiling glacial acetic acid is mixed with 259 parts of Bz-1-amino-2-methylbenzanthrone and the mixture refluxed for 1 hour with stirring, allowed to cool, filtered, and the residue is washed first with a small quantity of glacial acetic acid, then with water until the washings are neutral, and finally dried in vacuo. The beige-brown crystalline powder melts at 280° C. (uncorrected) and can be recrystallized from much glacial acetic acid.

The product corresponds to the formula

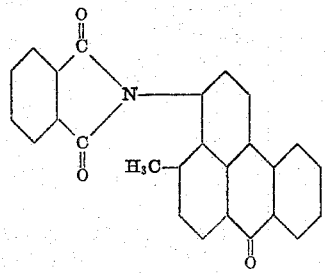

*Example 2*

When in Example 1 the 148 parts of phthalic anhydride are replaced by 193 parts of 3-nitrophthalic anhydride, the corresponding nitro derivative is obtained as a pale-brown powder corresponding to the formula

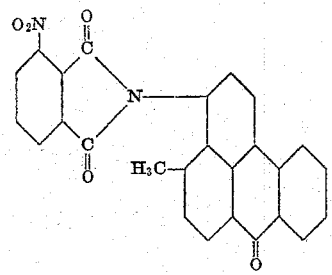

The nitro group can be reduced catalytically to the amino group by a known method, for example with Raney nickel.

The product corresponds to the formula

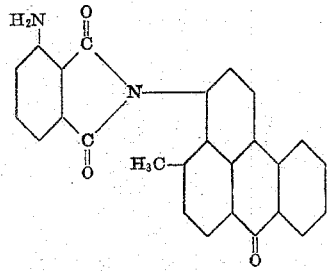

*Example 3*

When in Example 1 the 148 parts of phthalic anhydride are replaced by 198 parts of naphthalic acid-(1:8) anhydride, there likewise results a good yield of the corresponding bordeaux colored condensation product of the formula

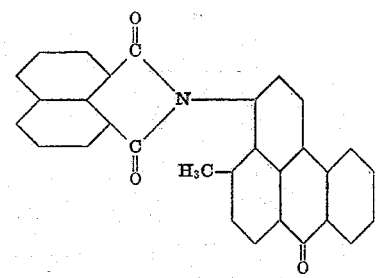

*Example 4*

When the product obtained as described in Example 1 is heated under reduced pressure beyond its melting point, a red-violet melt is formed which solidifies on being further heated. The resulting violet product can be recrystallized, for example from γ-butyrolactone. Its melting point is above 350° C. The product contains 1 mol of water less than the starting material and probably corresponds to the formula

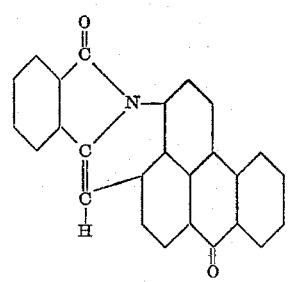

The identical violet substance is obtained when the product obtained as described in Example 1 is heated beyond its melting point in the presence of a high-melting substance, such as potassium acetate or a polyamide.

The identical result is obtained when the product obtained as described in Example 2 or 3 is used instead of the product obtained in Example 1; this procedure yields the analogous condensation products.

*Example 5*

1 part of Bz-1-amino-2-methylbenzanthrone is stirred at 180° C. into a melt of 2 parts of phthalic anhydride. On completion of the addition, the temperature is slowly raised to 285° C. and the mass is stirred at the same temperature for 15 minutes. The solidified mass is boiled with 50 parts of dilute sodium hydroxide solution (about 2 N), filtered, and the residue is washed until it is neutral. The dark-violet residue is dried, taken up in boiling γ-butyrolactone, the filtrate is cooled, and from it the violet condensation product described in Example 4 is then crystallized.

*Example 6*

99.5 parts of a condensation product of hexamethylenediamine and adipic acid, in the form of dry chippings, are "bread-crumbed" with 0.5 part of the dyestuff prepared as described in Example 1. The "bread-crumbed" chippings are then spun by the usual method, for example by the grid spinning method, at about 290° to 295° C. the filament obtained in this manner is dyed a brilliant red-violet tint which has outstanding properties of fastness to light and wetting. Alternatively, the polyamide spinning composition can be dyed by any other conventional method.

The identical dyeing results when 0.5 part of the condensation product obtained as described in the first paragraph of Example 4 is used instead of 0.5 part of the dyestuff according to Example 1.

*Example 7*

99.5 parts of dry chippings of polyethylene terephthalate are "bread-crumbed" with 0.5 part of the dyestuff obtained as described in Example 3. The "breadcrumbed" chippings are melted at about 285° C. by a usual method and the mass is spun, to yield a polyester filament of a violet tint which has good fastness properties.

When the dyestuff is used is first condensed as described in the first paragraph of Example 4, an identical dyeing results.

*Example 8*

A mixture of 7.5 parts of pyridine-2:3-dicarboxylic acid anhydride and 13 parts of Bz-1-amino-2-methylbenzanthrone in 100 parts by volume of acetic anhydride is stirred for 30 minutes at 110° C., then allowed to cool, and the precipitate is filtered off and washed with aceticanhydride until the washings are colorless. After having been dried, the resulting cyclic imide is entered at 290° C. into a melt of five times its own weight of zinc chloride. The melt is stirred for 5 minutes at 300 to 310° C., whereupon the color changes from brown to violet. The melt is allowed to cool and then boiled with water. The condensation product obtained in this manner probably corresponds to the formula

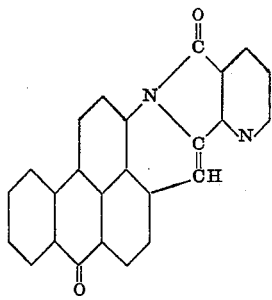

*Example 9*

A mixture of 12 parts of maleic anhydride and 25.9 parts of Bz-1-amino-2-methylbenzanthrone in 150 parts by volume of glacial acetic acid is refluxed with stirring. After 2 hours the reaction mixture is filtered while still hot, and the filtrate is treated with water until a precipitate begins to form. The hole is allowed to cool, filtered, and the precipitate is recrystallized from glacial acetic acid, to yield 20 parts of the yellowish brown cyclic imide of the formula

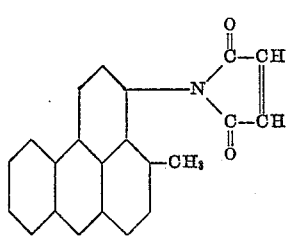

melting at 270° C.

*Analysis.*—$C_{22}H_{13}O_3N$. Calculated: C, 77.9; H, 3.9; N, 4.1%. Found: C, 77.5; H, 3.9; N, 4.1%.

7.5 parts of the above imide are stirred at 290° C. into a melt of 40 parts of zinc chloride. The color changes spontaneously from brown to violet. After 3 minutes at 290 to 300° C., the melt is allowed to cool and then boiled with water until the filtrate is free from chlorine ions. The resulting violet condensation product probably corresponds to the formula

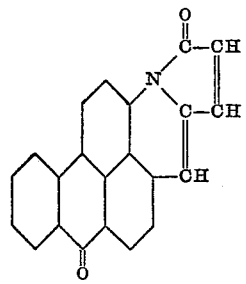

*Example 10*

A mixture of 2.8 parts of anthraquinone-2:3-dicarboxylic acid anhydride, 2.6 parts of 2-methyl-Bz-1-aminobenzanthrone, 0.2 part of ferric chloride and 50 parts by volume of trichlorobenzene is stirred for ½ hour at 110° C. The temperature is then raised within 1 hour to 200° C. and maintained at 200° C. for ½ hour. The mixture is then refluxed with stirring for ½ hour, allowed to cool, filtered, and the filter residue is thoroughly washed with methanol and then with water, to yield 4.5 parts of the khaki-colored imide of the formula

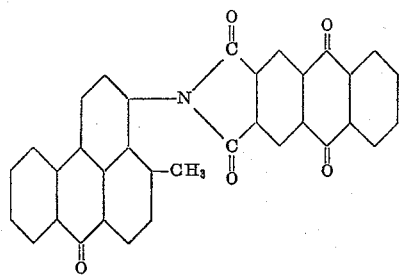

The imide can likewise be converted into a violet condensation product by being heated.

*Example 11*

A mixture of 16.4 parts of pyromellitic acid tetrachloride, 28 parts of 2-methyl-Bz-1-aminobenzanthrone and 100 parts by volume of nitrobenzene is heated for 2 hours at 150° C., then stirred for 1 hour at 200° C., and the precipitate formed on cooling is filtered off, thoroughly washed with methanol, and dried, to yield 27 parts of the olive-grey diimide of the formula

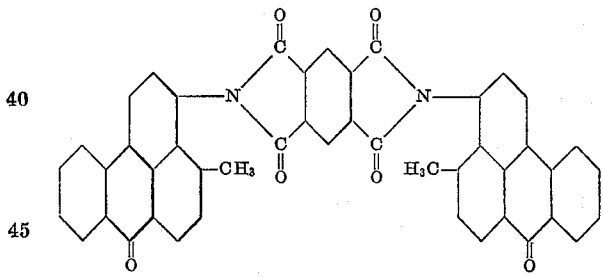

On being heated, this diimide likewise forms a condensation product of deep violet color.

*Example 12*

A mixture of 7 parts of naphthalene-tetracarboxylic acid, 13 parts of 2-methyl-Bz-1-aminobenzanthrone and 100 parts by volume of nitrobenzene is refluxed with stirring for 2½ hours, allowed to cool, filtered, and the filter residue is thoroughly washed with methanol. The resulting imide is entered at 290° C. into 6 times its own weight of zinc chloride and heated for a short time at 320° C., allowed to cool and thoroughly washed with water. The condensation product obtained in this manner is practically black and dyes cotton from the vat grey tints. The compound probably corresponds to the formula

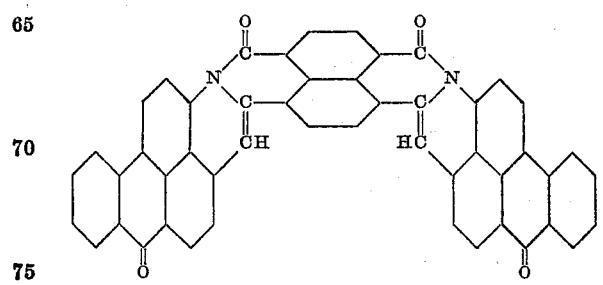

Example 13

A solution of 7.1 parts of phthalic anhydride in 75 parts by volume of boiling glacial acetic acid is mixed with 13 parts of 2-ethyl-Bz-1-aminobenzanthrone, and the whole is refluxed with stirring for 1 hour, suction-filtered while still hot, and the filtrate is treated with a small amount of water until turbidity sets in. The ochre-yellow imide is dried and then at 290° C. stirred into 5 times its own weight of zinc chloride, and the melt is then stirred for 5 minutes at 340° C. The solidified violet melt is boiled with water until the filtrate is free from chlorine ions. The resulting violet condensation product probably corresponds to the formula

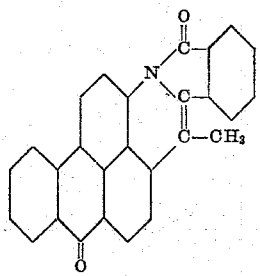

Example 14

37 parts of the violet condensation product obtained in Example 4 are dissolved with heating in 1000 parts by volume of anhydrous nitrobenzene. At 140° C., with vigorous stirring, a solution of 20 parts of bromine in 100 parts by volume of anhydrous nitrobenzene is added dropwise within 1½ hours. The mixture is then stirred for 5 hours at 175° C., allowed to cool overnight, and the precipitate is filtered off, washed with alcohol and dried in vacuo.

According to its analysis the product thus obtained is the monobromo derivative.

A mixture of 22.5 parts of the above monobromo derivative, 12.3 parts of 1-aminoanthraquinone (10% excess), 8.4 parts of sodium carbonate, 0.6 part of cuprous chloride and 275 parts by volume of nitrobenzene is stirred for 6 hours at 200° C. in a round-bottom flask equipped with a descending condenser, then refluxed for 10 hours, allowed to cool, and the precipitate is filtered off and thoroughly washed with alcohol. The resulting anthrimide of the formula

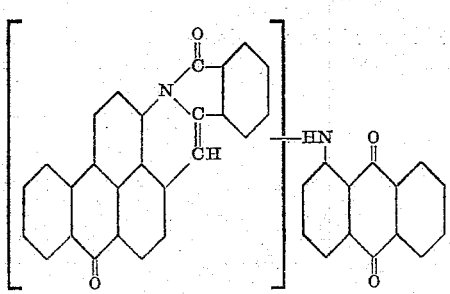

is difficult to vat.

9 parts of the above anthrimide are entered at 115–120° C. into a melt of 12 parts of potassium hydroxide and 28 parts of ethanolamine and stirred for 1 hour. The hot melt is poured over ice and for 1 hour air is passed through. The precipitate formed is filtered off and washed until it is neutral, to yield 7.5 parts of a readily vattable violet substance which is probably a dianthrimide-carbazole.

What is claimed is:

1. A dyestuff selected from the group consisting of dyestuffs of the formulae

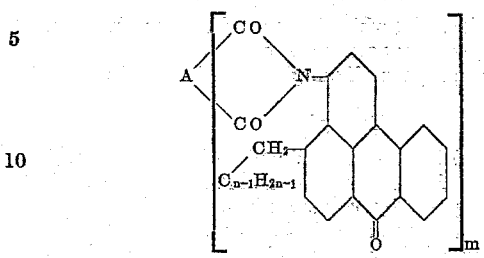

and

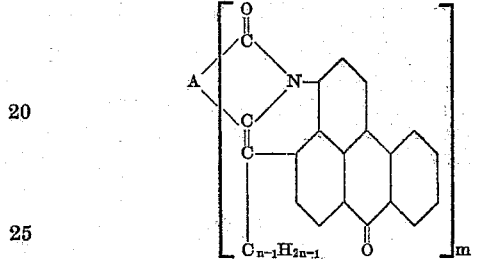

in which $m$ is a whole number from 1 to 2, $n$ a whole number from 1 to 5, and A represents a member selected from the group consisting of alkylene and carbocyclic arylene radicals in which the —CO— groups are separated from one another by 2 to 3 carbon atoms.

2. A dyestuff as claimed in claim 1, wherein $m$ is 1, A is 1,2-phenylene, and $n$ is a whole number from 1 to 5.

3. A dyestuff as claimed in claim 1, wherein $m$ is 1, A is 1,8-naphthylene, and $n$ is a whole number from 1 to 5.

4. A dyestuff as claimed in claim 1, wherein $m$ is 1 and A is ethylene.

5. A dyestuff of the formula

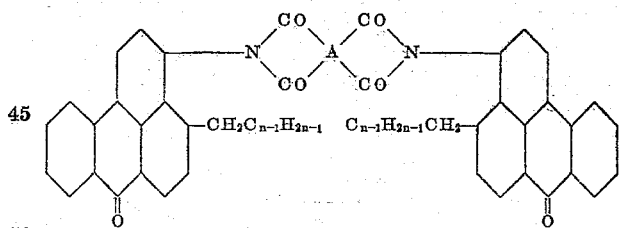

wherein A represents 1,4,5,8-naphthylene, and $n$ is a whole number of at most 5.

6. A dyestuff of the formula

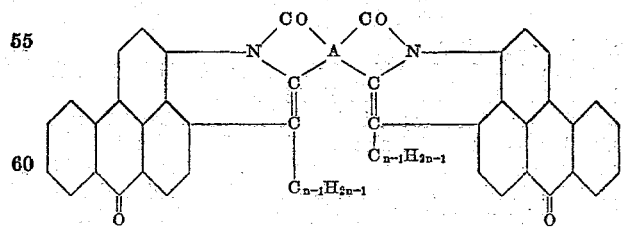

wherein A represents 1,4,5,8-naphthylene, and $n$ is a whole number of at most 5.

7. A dyestuff of the formula

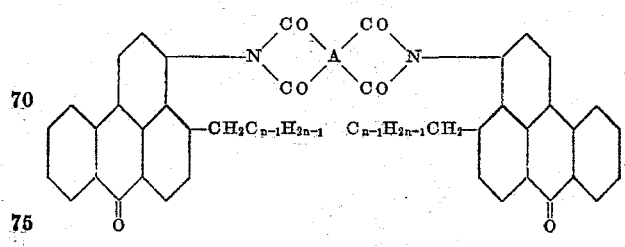

wherein A represents phenyl to which the valences of each hetero-ring are connected in the ortho-position with respect to each other, and $n$ is a whole number of at most 5.

8. A dyestuff of the formula

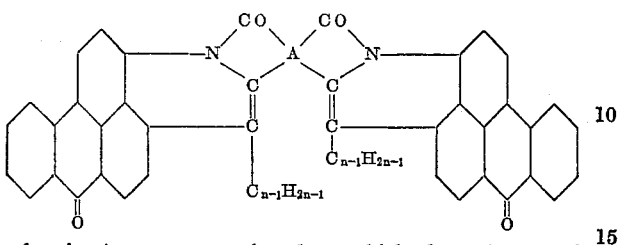

wherein A represents phenyl to which the valences of each hetero-ring are connected in ortho-position with respect to each other, and $n$ is a whole number of at most 5.

9. The dyestuff of the formula

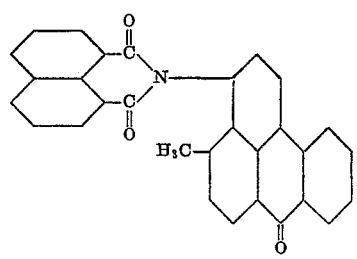

10. The dyestuff of the formula

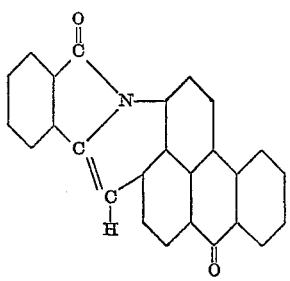

11. The dyestuff of the formula

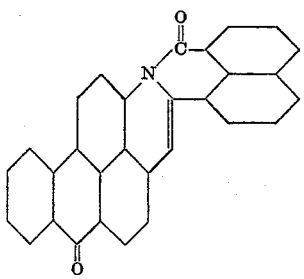

12. The dyestuff of the formula

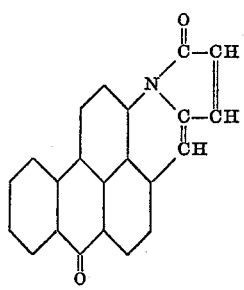

13. The dyestuff of the formula

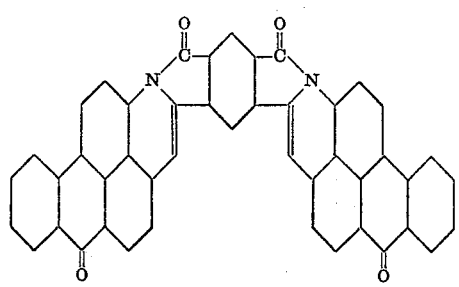

No references cited.

UNITED STATES PATENT OFFICE
CERTIFICATE OF CORRECTION

Patent No. 3,036,077                            May 22, 1962

Hans Altermatt

It is hereby certified that error appears in the above numbered patent requiring correction and that the said Letters Patent should read as corrected below.

Column 4, line 63, for "the" read -- The --; column 5, line 5, strike out "is", first occurrence; line 41, for "hole" read -- whole --; same column 5, lines 45 to 54, the formula should appear as shown below instead of as in the patent:

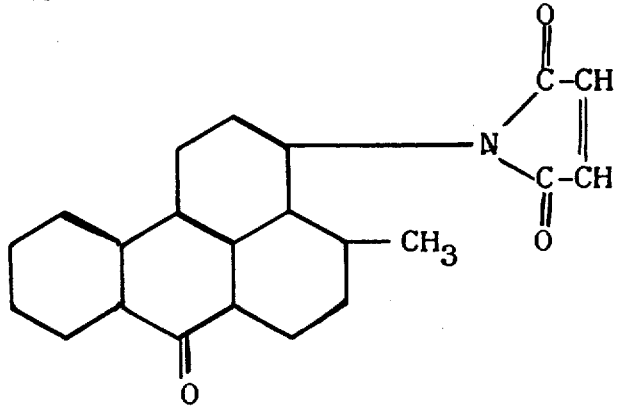

Signed and sealed this 4th day of December 1962.

(SEAL)
Attest:
ERNEST W. SWIDER
Attesting Officer

DAVID L. LADD
Commissioner of Patents